A. R. DODGE.
METER FOR ELASTIC FLUIDS.
APPLICATION FILED MAR. 17, 1908.
1,087,930.
Patented Feb. 24, 1914.
3 SHEETS—SHEET 3.
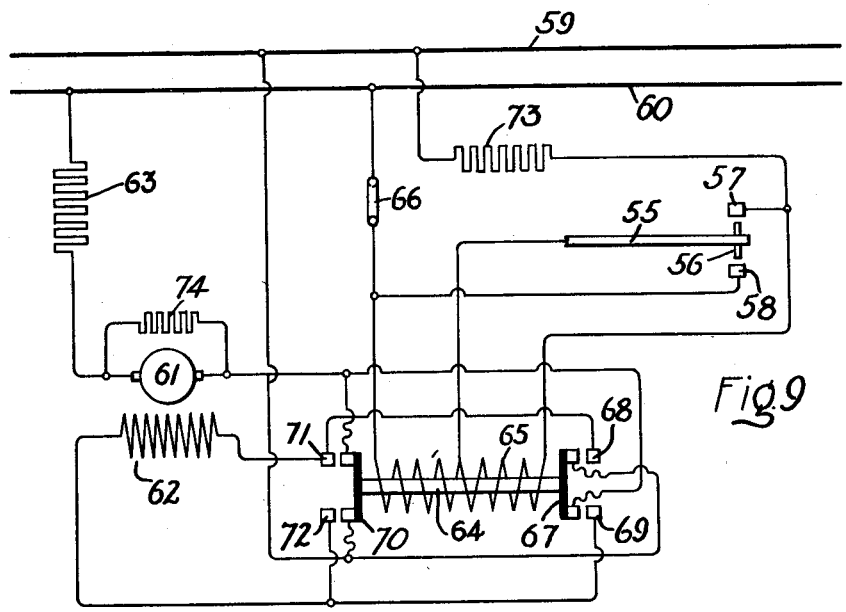
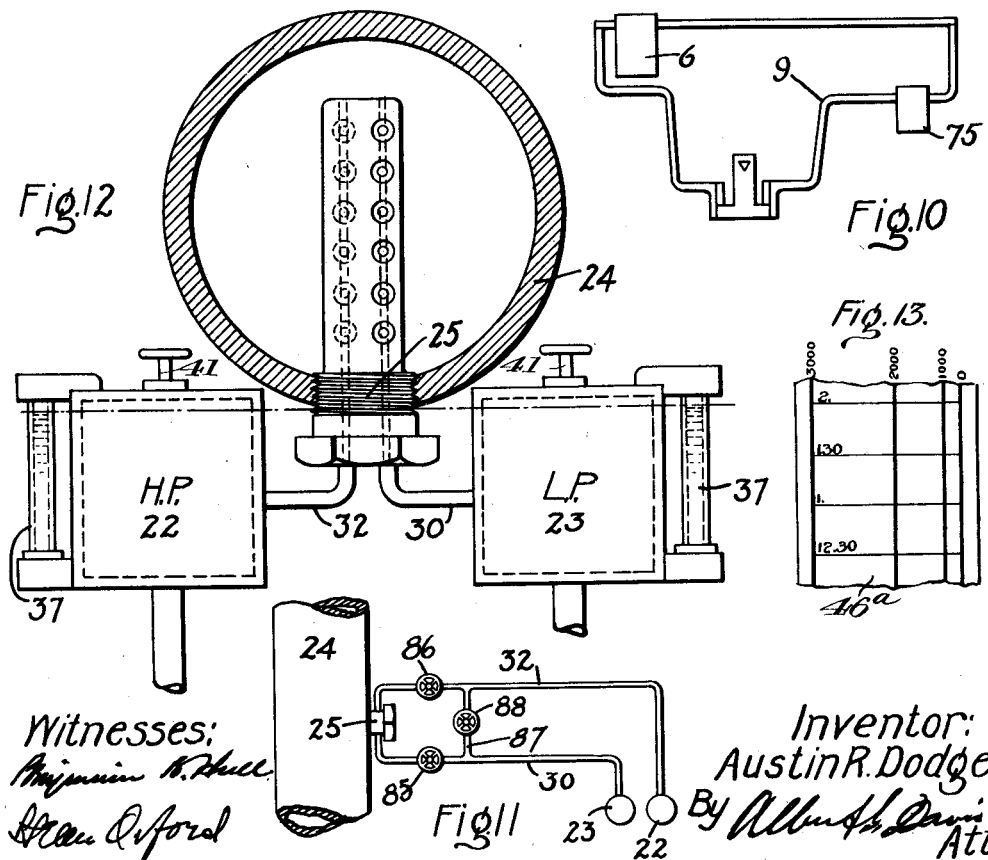
Witnesses:
Inventor:
Austin R. Dodge,
By
Atty.

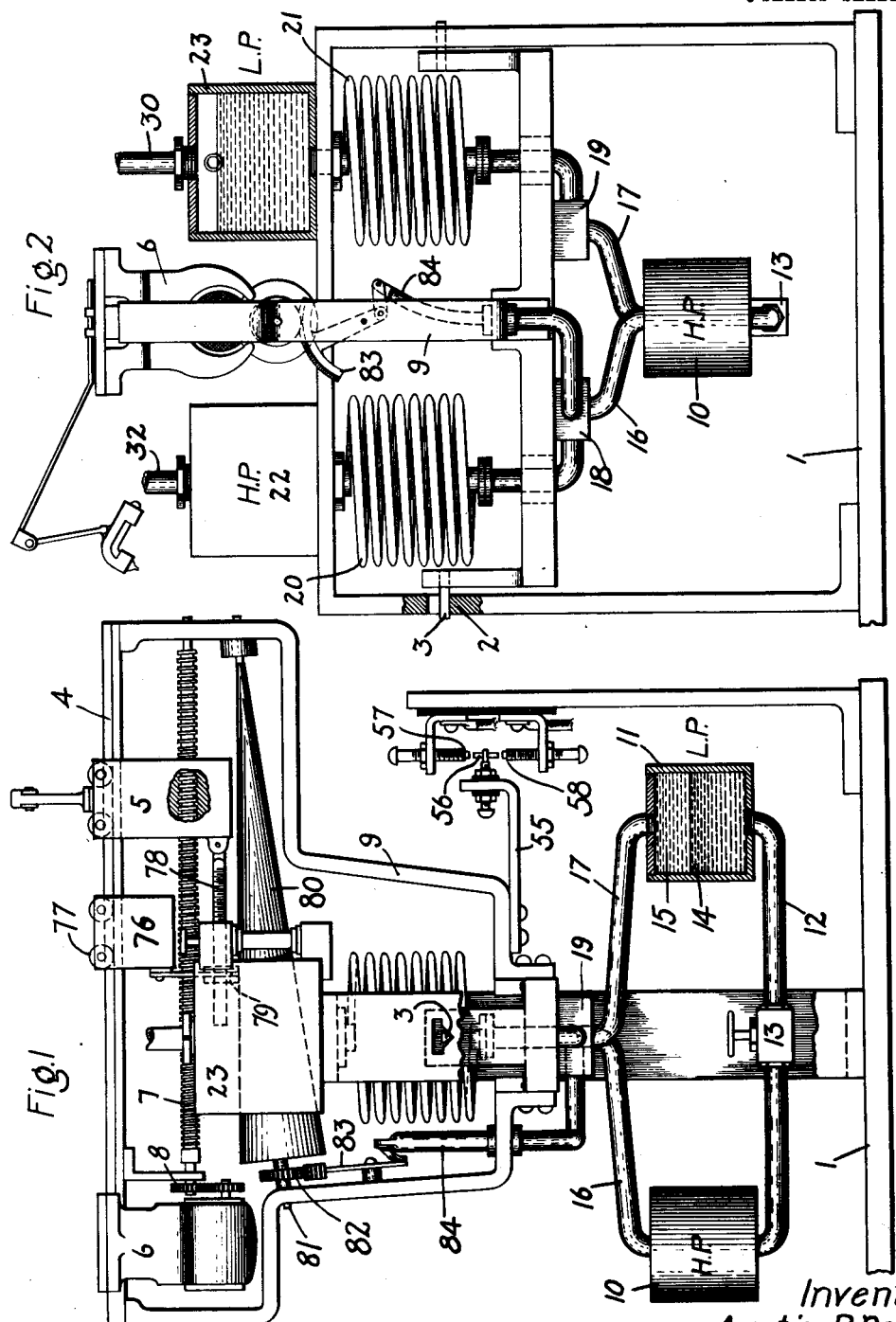

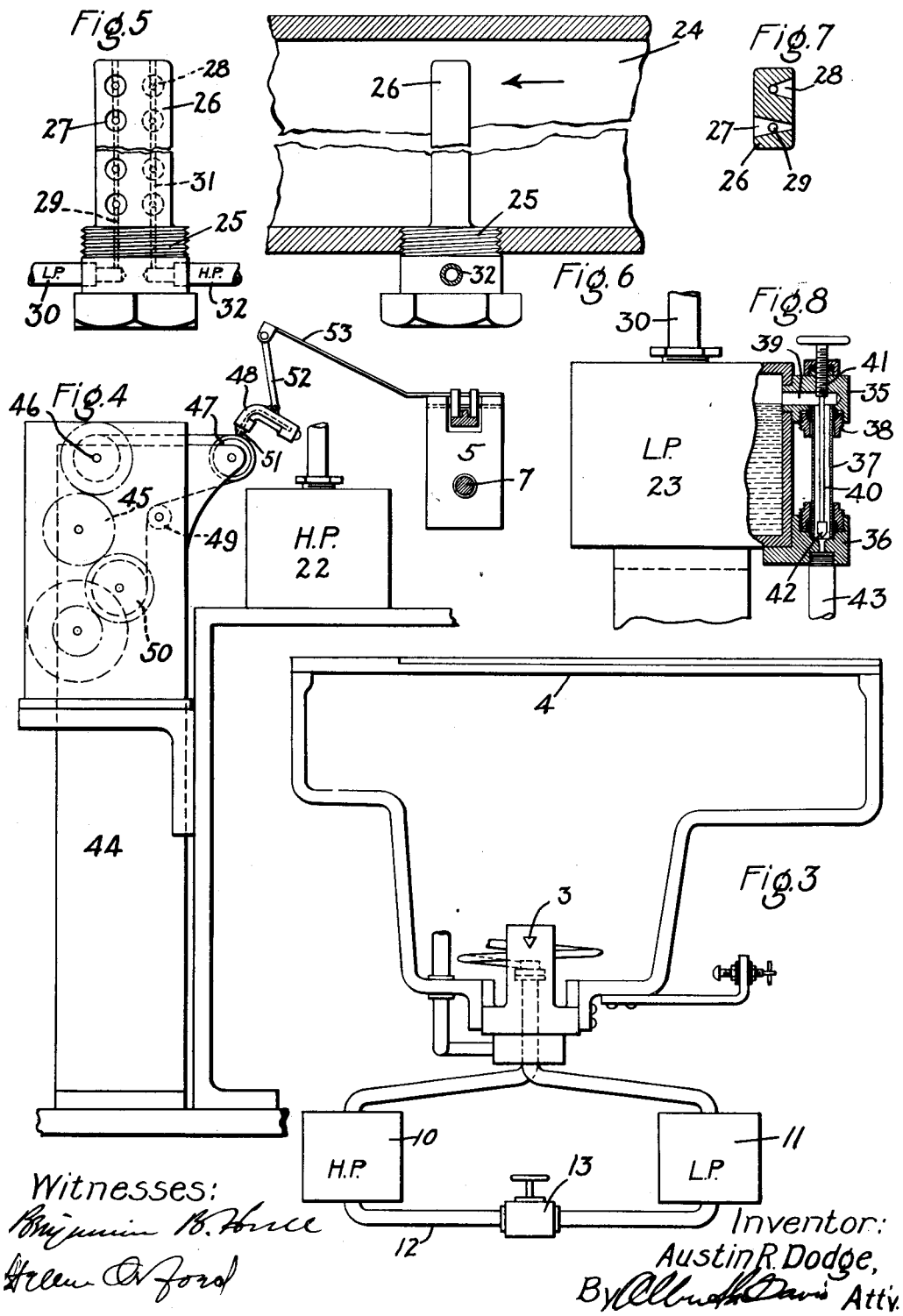

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

METER FOR ELASTIC FLUIDS.

1,087,930. Specification of Letters Patent. Patented Feb. 24, 1914.

Application filed March 17, 1908. Serial No. 421,696.

*To all whom it may concern:*

Be it known that I, AUSTIN R. DODGE, a citizen of the United States, residing at Schenectady, county of Schenectady, State of New York, have invented certain new and useful Improvements in Meters for Elastic Fluids, of which the following is a specification.

The present invention relates to meters for measuring the rate of flow of steam or other elastic fluid in a main or conduit.

The invention has for its object to provide a meter which will accurately indicate or record the amount of elastic fluid flowing through a main.

The invention is more especially adapted for recording the flow of steam from a source of supply to a turbine or reciprocating engine and will be described with that in view, but it is to be understood that the invention is not to be construed as limited thereto unless specifically stated in the claims, since it is of wider application.

My invention is based on the theory that as the quantity of elastic fluid flowing per unit of time through a conduit or main changes its velocity changes. I utilize this change in velocity to create a desired pressure difference which difference is weighed by suitable mechanism, the position of some part of said mechanism at any instant giving, by comparison with a suitably formed scale, an indication of the rate of flow of fluid flowing in the main. By using a marker and a moving chart a permanent record is made of these indications.

In carrying out my invention a pivoted member or scale beam is mounted on a suitable frame and supported by knife edges to reduce friction. Mounted on and moving with the beam is a hollow member, receptacle or container comprising, for example, two connected vessels or cups having suitably shaped walls, which cups preferably contain mercury but which may contain other fluid heavier than that being metered. The cups are or may be disposed at equal distances from and on opposite sides of the balancing point or pivot of said beam. The beam is tilted automatically by varying the weight of th.. contents of said hollow member in response to changes in rate of flow of fluid in the main being metered; i. e., by causing mercury to flow from one cup to the other, the amount of mercury transferred and the direction of flow being a function of the variations in steam pressure due to changes in velocity of the steam or other fluid to be metered. Located in the main conduit or conductor pipe carrying the steam or other fluid to be measured is an agent, that, in response to changes in velocity of said fluid, causes a difference in pressure. This differential pressure is communicated to the mercury cups by small pipes, that of higher pressure communicating with one cup and that of lower pressure with the other.

As the velocity of the steam in the main conduit may vary in different parts of its cross-section it is important to have an agent whose action will be responsive to the mean velocity of the steam flowing in different parts of the conduit rather than to that of any particular part. This can be accomplished in a variety of ways. I attain the desired result by the use of a plug or device which extends from one side of the conduit well in toward its center, or it may extend beyond the center well toward the farther side. In this plug are two sets of funnels or openings, one set, viz. the high pressure, facing against the direction of flow and the other, viz. the low pressure, facing in the direction of flow. All the funnels of a given set are connected in multiple to the same passage, pipe or conduit, and the two sets are connected by passages, pipes or conduits with the mercury cups mounted on the pivoted beam.

If steam under high pressure is to be conveyed from a main to a moving element of a meter in such manner as not to interfere with its freedom of movement special means must be provided for the purpose. To carry out this very important feature of my invention two coils are provided, one connecting one set of funnels with one mercury cup and the other connecting the second set of funnels with the second cup. These coils are made by winding up a very thin walled tube after the fashion of a helical spring and subsequently flattening the turns in planes substantially perpendicular to the axis of the coil to eliminate the effect of pressure therein. This results in an exceedingly flexible coil, and the pressure therein, which may be as high as 200 pounds per square inch, will have no tendency to force the turns apart which would interfere with the accuracy of the indications.

Since the beam is pivotally supported in a horizontal position and is actuated by the cup containing the most mercury it follows that unless means are provided to prevent it the beam would tilt at one end in one direction or the other and stay in that position no matter how great the change in the rate of flow of fluid in the main might be so long as said change continued to be of the same character, i. e., an increase in flow on one hand or a decrease in flow on the other. Such a deflection of the beam could of itself give no useful indication. In order to utilize the tilting of the beam to directly indicate the rate of flow, I mount a weight on the beam and cause it to move automatically forward or backward thereon as the rate of flow changes. To this weight is affixed a device such as a pointer which by its position with reference to a suitable scale may directly indicate the rate of flow, or it may make a record on a chart which is driven by clock-work or other means at any predetermined rate of speed. Inasmuch as the position of the beam is sensitive to changes in the rate of flow of the fluid, I utilize the beam in the present illustration to control a motor which moves the weight toward the outer end of the beam as the rate of flow of the steam in the main decreases, and away from it as the rate of flow increases. This control may be accomplished in any well known manner. When the beam is balanced (in the present illustration of my invention horizontal) the motor is out of operation, when tilted downward at one end the motor drives the weight inward toward the pivots, and when tilted upward at said end the motor drives the weight in the opposite direction. In other words the motor adjusts the weight on the beam until it balances the force exerted thereon by the difference in steam pressure due to the funnels. In this particular the meter somewhat resembles the well-known platform scale wherein the thing to be weighed is mounted on the platform and the weight is slid by hand along the beam until it balances the thing being weighed when the free end of the beam will be balanced between the upper and lower stops. I may use motors of various kinds for this purpose but prefer an electric motor on account of its simplicity, small size and the ease with which it can be started in either direction and stopped. Also because it can be mounted directly on the beam and preferably but not necessarily on the side away from the pivots and the connections leading thereto made so flexible as not to interfere with the freedom of movement of the beam. The necessary tilting movement of the beam to start or stop the motor is small, the amount depending upon the distance the contacts are from the axis of movement. I have found that a movement of one one-hundredth of an inch each side of the central or neutral position and is sufficient, but in some cases it may be made more or less.

As the fluid flowing from the source of supply is subject to variations in pressure, I provide a means for compensating therefor. As an illustration of this feature of my invention, a device sensitive to pressure is provided that modifies the effective action of the weight on the beam. I have elected to show a divided weight on the beam the parts of which normally maintain a fixed position with respect to each other, but when the pressure increases above a certain point one part is moved toward the other part and when the pressure decreases below said point is moved away from it. The parts of the weight are suitably connected as by a screw-threaded rod, and the nut that regulates the position of the parts one to the other is turned in one direction or the other by a device such as a cone or suitably shaped member carried by the beam and turned by a device sensitive to pressure changes. It is important to support the pressure compensating means as well as the weight actuating mechanism on the same knife edge pivots so as to eliminate errors of all kinds which would result from independent supports.

Since the changes in superheat are relatively small or take place slowly, and since their effect on the total rate of steam flow is small, they can be compensated for by hand-actuated means, such for example as changing the position of the pen or marker with respect to the main weight.

In the accompanying drawings, which illustrate one of the embodiments of my invention, Figure 1 is a view in side elevation of my improved meter; Fig. 2 is an end view of the same; Fig. 3 is a detail view of the scale-beam and some of its attached parts; Fig. 4 is a view in side elevation of the clock mechanism and the roll of paper driven thereby upon which a record is to be made; Fig. 5 is a detail view of the agent or device by means of which changes in the rate of fluid flow in the steam mains are communicated to the meter proper; Fig. 6 is an edge view of the said agent or device showing its location in the steam-carrying conduit; Fig. 7 is a cross-section of the same; Fig. 8 is a cross-sectional detail view of one of the reservoirs interposed between the device responsive to the rate of flow and a mercury-containing cup carried by the beam; Fig. 9 is a diagram of the circuit connections of the motor; Fig. 10 is a detail view of a slight modification; Fig. 11 is a detail view showing an arrangement of piping for connecting the meter to a main;

Fig. 12 is a detail view showing a somewhat different arrangement of the reservoirs, and Fig. 13 is a detail view showing a suitable scale or chart for recording the indications of the meter.

1 indicates a base, and supported thereon is a frame of suitable shape having seats 2 on opposite legs to support the knife-edges 3 attached to the movable element. The movable element comprises a horizontally disposed beam 4 having a finished upper surface to receive the rollers on the weight 5, called the main weight, and permit it to travel to and fro freely subject to the control of the motor 6. Fastened to the left-hand end of the beam is the electric motor 6 comprising the usual stationary field-magnet and rotating armature. Located below the beam and carried in suitable bearings is a lead-screw 7 that is threaded to the main weight 5. The armature shaft is connected to the screw through speed-reducing gearing 8. The main weight is supported from the beam by rollers and is threaded to the screw. The beam itself is provided with a depending frame 9 that is provided with and supported by the knife-edges 3.

Below the frame 9 and carried thereby are two mercury-containers or cups 10 and 11 that are connected on their under side by a conduit 12 that may contain a valve 13. The valve 13, when used, is closed in starting the meter to prevent the fluid under pressure from driving the mercury out of the cups. After pressure is admitted to both cups the valve is opened and the meter is ready for use.

As will hereinafter appear more fully some of the parts are subjected to a pressure higher than the others. For convenience the principal parts subjected to the higher pressure are marked with the letters H. P. and those subjected to the lower pressure with the letters L. P. The cup 10 being on the high pressure side will be called the high pressure cup and the cup 11 being on the low pressure side will be called the low pressure cup. It is through the conduit 12 that the mercury flows from one cup to the other when there is a change in the rate of flow of the fluid in the supply conduit. These cups are preferably but not necessarily situated at equal distances from the knife-edge pivots of the beam so as to balance each other. A change in level of the mercury 14 in the cups causes the beam to tilt in one direction or the other above its fulcrum. On top of the mercury in each cup is a body of water 15 due to the condensation of the steam. The cups are supported from the depending frame of the beam by the pipes 16 and 17 which also carry fluid. These pipes are fastened into blocks 18 and 19 secured to the frame on opposite sides, which blocks are directly in line with and under the knife-edge pivots, and in the same vertical plane.

Depending from the main frame are flexible connectors 20 and 21 which convey fluid, water in this case, under pressure to the mercury-containing cups. Each is composed of a number of turns of flattened tube wound after the fashion of a helical spring. The turns of the coils are flattened after the coil is wound and in planes substantially perpendicular to their axes so that they will be exceedingly flexible and the pressure of the fluid within them will have no tendency to force the turns apart. The axis of each coil is vertical and as near as possible in the plane of the pivots so that the resistance to tilting of the beam is reduced to a minimum. The connector 20 is connected to the water-containing reservoir 22 at its upper end and at the lower end to the block 18 and the mercury cup 10. The connector 21 is connected to the water-containing reservior 23 at its upper end and to the block 19 and mercury cup 11 at its lower end.

The reservoirs contain a fairly large amount of water, their cubical contents being greater than those of the cups, so that when mercury is displaced from a cup the latter will be quickly filled with water. In this manner the column of water above each body of mercury is maintained practically constant. The means employed to dispose of surplus water will be described later.

In the supply conduit 24, Figs. 5 to 7, is an agent sensitive to changes in the rate of flow of the elastic fluid. It comprises a support 25 which is screw-threaded into the conduit so that it can readily be removed or inserted. When removed the opening can be closed by a threaded plug in the usual way. Integral with the support is a rectangular part 26 containing a plurality of conical-shaped funnels, arranged in sets 27 and 28. Those of set 27 have their large ends facing away from the direction in which the fluid is moving. At a point midway their length these low pressure conical funnels are connected to the passage 29, and the latter is connected by the pipe 30 with the reservoir 23 and low pressure mercury cup 11. The set of funnels 28 do not extend through the part 26 as do the funnels 27, and are reversely arranged, that is to say, they are conical in shape with the large ends facing the direction from which the flowing fluid is received. These high pressure funnels are connected by the passage 31, shown in dotted lines, and the latter communicates with the pipe 32, the reservoir 22 and the high pressure mercury cup 10. The fluid pressure within the passage 31 is equal to the mean static pressure within the main conduit 24 plus the pressure due to the velocity of flow and the density of the flowing fluid. The pressure in the passage 29 is lower than the static pressure by a certain amount, determined by the velocity and density of the flowing fluid.

I regard the arrangement of the funnels described as being of particular importance. By their arrangement the power available for actuating the meter is amply sufficient for all conditions, and the power being comparatively large and the resistance to movements of the parts small, the latter may be disregarded. Further, the construction shown requires no special fitting in the main pipe line, thus obviating a large expense in installing. I do away with all stuffing boxes which are liable to give trouble, and when associated with moving parts create objectionable friction.

It is evident that the construction of the funnels is exceedingly cheap and durable. It has the further advantage that only one hole has to be made in the steam main which can be bored and tapped without disturbing the main in its position. The agent further has the advantage that it is responsive to the mean velocity of the steam instead of to the velocity at any particular point in the main and hence the indications of the meter are more accurate. The arrangement gives a greater deflection or transfer of mercury from one cup to another than where the velocity at one point only is considered. Both the leading funnels 28 and the trailing funnels 27 receive steam in the same plane, therefore, the steam is not diverted by the wall of one funnel before acting upon another funnel. It is possible to locate the agent in a short length of pipe and to obtain the same accurate results as if it were located in a long straight pipe. Owing to the construction and nature of said agent it can be used for other forms of meter than the one shown and many or all of its advantages will follow therefrom.

In a meter of this character there is always a certain amount of condensation and the level of the mercury in the cups changes somewhat with changes in pressure due to the action of the funnels. In order to obviate the effects of a change in water level and to keep the space in the cup above the mercury filled with water at all times, the reservoirs 22 and 23 are provided. On the side of one or both reservoirs, preferably both, is a device for automatically discharging the excess water as shown in Fig. 8. It comprises supports 35 and 36 which carry a gage glass 37 between them, suitable packings 38 being provided to prevent the escape of fluid. The upper support communicates by the passage 39 with the chamber in the reservoir and acts as a dam or overflow to maintain a constant level. Extending vertically in the gage glass is a thermostatic rod 40 which is provided with a screw 41 at its upper end for adjusting its vertical position and a valve 42 at its lower end adapted to engage a seat on the support 36. When the water overflows the dam and runs down into the gage glass it chills the thermostatic rod and causes the same to decrease in length and open the valve and permit the excess water to escape by the pipe 43. On the other hand when the water escapes and steam strikes the rod it expands and closes the valve. This automatic opening and closing of the valve takes place at more or less frequent intervals so long as the meter is in operation. Owing to the fact that the cubical contents of the reservoirs are comparatively large with respect to those of the connectors and mercury cups, any change in level of the mercury due to pressure changes is immediately followed by a change in the amount of water in the cups, and since the heights of the water columns on both sides of the pivots remain substantially constant at all times, it does not affect the accuracy of registration.

The means for recording the variations in the rate of flow of the fluid will now be described.

Mounted on the base is an upright frame member 44 which supports a clock mechanism 45 of any approved construction. It may be wound by any suitable means. Mounted on a spindle 46 is a roll of paper 46ª which may be suitably ruled with horizontal lines to indicate time and vertical lines to indicate the flow of steam in pounds per unit of time. See Fig. 13. The paper runs over a drum 47 and is engaged by the needle, pen, or marker 48 carried by the main weight 5. After going over the drum the paper passes around an idler 49 and is wound on a drum 50 driven by one of the gears of the clock. The marker which I employ comprises a small glass receptacle containing ink and an L-shaped tube 51, one end of which enters the body of ink while the other rests on the paper or chart driven by the clock-work. The marker is attached to the lower end of a link 52, the upper end being pivoted to the arm 53 carried by the main weight 5. The marker should be free to adjust itself on the chart as the position of the main weight changes.

The means for controlling the electric motor will now be described.

Mounted on some part of the moving element of the meter is an arm or equivalent device 55 that tilts with the beam about the knife edge pivots. On the arm is a contact 56 forming a part of the motor controller. To a fixed support are secured adjustable contacts 57 and 58 forming the remainder of the controller. The contacts are carried by adjusting screws and for the purpose of illustration the clearance between them and the moving contact 56 has been exaggerated.

Referring to Fig. 9, 59 and 60 indicate the mains of any suitable source of current supply. 61 indicates the armature of the series motor, and 62 its field magnet winding. In series with the armature is a resistance 63 to reduce the flow of current therein. The circuit of the motor is controlled by a solenoid relay magnet comprising a core 64 and a winding 65. One end of the winding is connected to contact 58 and to the main 60 through the switch 66 that is normally closed and is opened when it is desired to cut the apparatus out of circuit. The other end of the winding is connected to the stationary contact 57 and the main 59. At a point midway the ends the coil is connected to the movable contact arm 55. Situated at the right-hand end of the core is a bar 67 that carries contacts which coöperate with the fixed contacts 68 and 69 to cause the motor armature to revolve in one direction. Situated at the left hand end of the core is a bar 70 that carries contacts which coöperate with fixed contacts 71 and 72 to cause the armature to revolve in the opposite direction. Owing to the fact that the solenoid magnet coil is always in circuit, as soon as the contact 56 moves away from contact 57 or 58, the effect of the coil on the core is to centralize it, thus doing away with springs. The action of this part of the meter is as follows: Assuming that a change in flow of the steam in the main 24 causes enough mercury to enter the low pressure cup 11 to depress the beam 4, arm 55 and contact 56, the current will pass as follows: Starting from the main 60 it flows through the switch 66 to the contact 58 thereby shunting the left hand portion of the winding 65 of the solenoid magnet, thence through contact 56, arm 55 to the central tap of the winding 65, thence through the right hand part of the coil and resistance 73 to the main 59. This causes the core 64 to be moved bodily to the right closing the circuits of motor contacts 68 and 69. The circuit through the motor will then be as follows: from the main 60 through the resistance 63 and armature 61; contact 69, to and through the field winding 62 to contact 71, thence to contact 68, and the main 59. This will cause the armature to revolve in a direction to move the main weight 5 toward the pivot and away from the free end of the beam until the latter is balanced and the contact 56 breaks the relay circuit when the motor stops.

Assuming that the fluid pressure on the high pressure cup 10 decreases and the mercury in the low pressure cup is at a higher level, mercury will flow from the latter to the former thus tilting the free end of the beam and the contact arm 55 upward closing the contact 57, current will pass through the parts as follows: Starting from main 60 it flows through the switch 66 to and through the left hand portion of the solenoid coil 65, the right hand portion being shunted or short circuited, thence through the arm 55, contacts 56 and 57, resistance 73, to the main 59. This pulls the core to the left and closes the motor circuit contacts 71 and 72. The motor then starts into operation and its circuit is as follows: Starting from the main 60, the current flows through the resistance 63 and armature 61 in the same direction as before, thence through the contact 71 to and through the field winding 62 in the opposite direction to that previously described, which reverses the direction of rotation of the armature, thence through the contact 72 to the main 59. This will cause the armature to revolve in a direction to move the main weight 5 toward the free end of the beam and away from the pivots. This action continues until the weight is moved to a position to balance the effect of the mercury cups when the relay circuit will be opened at the contact 56 and the motor will stop. This action is repeated each time a change in flow in the main 24 takes place, and the marker carried by the main weight makes a permanent record of the same on the chart. As the flow in the main increases the main weight moves from right to left, and in the reverse direction as the flow decreases. This means then that the "zero" is on the right hand side of the chart and higher values on the left. I have shown the main weight on the right hand side of the knife edge pivots but it is not necessarily limited to this position.

In order to stop the motor armature suddenly, when the supply circuit is interrupted, a brake is provided comprising a resistance 74 connected in shunt to the armature. When the main circuit is interrupted the armature has a tendency to revolve due to its inertia, the action being similar to that of a generator running on a short circuit. This stops the armature instantly or practically so, and prevents overtravel which would be detrimental to the accuracy of the meter.

I have shown the motor 6 mounted on the beam 4 at one side of the knife edge pivots and the main weight 5 on the other. Under such conditions the mass of the weight must be sufficient to balance the weight of the motor as well as to balance the pressures on the mercury cups. I may provide a separate weight 75 for balancing the motor if desired as shown in Fig. 10 which may be adjusted on the frame 9 or other suitable part. When this is done the center of gravity of the main weight would be directly above the center line of the knife edges when the flow is zero.

The meter as described thus far is capable of effectively recording the flow of steam in a main and I have used the same for this purpose. Where the pressure of steam in the main changes for any reason it is desirable to provide means for compensating for such changes. As an illustration of this feature of my invention, I have shown one means, device or mechanism, but it is to be understood that the invention is not specifically limited thereto unless so stated in the claims. This means, device or mechanism comprises a weight 76, which, to distinguish it from the other part or main weight, may be termed an auxiliary or compensating weight. It is arranged to move back and forth on the beam 4, rollers 77 being provided to reduce friction. This weight is separated from the main weight by a distance more or less great, and so long as the steam pressure in the main 24 remains constant it will and should move with the main weight as a unit. When the pressure changes, the flow remaining the same, it is necessary for the auxiliary weight to move independently of the main weight. The movement of the parts of the weight with respect to each other may take place while the motor 6 is moving the main weight or independently thereof. Connecting the two weights is a screw 78 that enters a nut 79 carried by an arm depending from the auxiliary weight. This nut is held against endwise movement with respect to weight 76 but is free to revolve. Situated below the nut and in engagement therewith is a cone or other suitable power transmitting means 80 that is mounted on a spindle 81 carried by suitable bearings on the frame 9. On the spindle is a pinion 82 meshing with a segmental gear pivotally supported on an arm 83. The lower end of the arm is connected by a link to the upper end of a pressure-responsive device 84. As shown, this device is constructed after the fashion of a Bourdon tube and tends to straighten as the pressure on one side of the apparatus increases, in this case the high-pressure side. In other words, it is connected to the fluid conduit in the block 18, and the latter is connected to the funnel openings 28 and the high-pressure mercury cup 10. As the pressure increases, assuming the flow to be constant, the segmental gear moves clockwise and the cone counter-clockwise. This in turn rotates the nut reference numeral 79 on the screw 78 in a manner to move the auxiliary weight toward the main weight, it being noted that the position of the latter is determined by the lead screw 7 and the motor 6. A decrease in pressure moves the auxiliary weight away from the main weight. When the rate of flow in the main is high, the auxiliary weight has to be moved toward or away from the main weight by a greater amount to compensate than when the rate of flow is low. In other words, the pressure correction has to be greater for a large than for a small steam flow. The Bourdon tube illustrated is so designed that it has a constant length of movement at its outer end for each unit change of pressure, but the invention is not limited to this particular.

It will be noted that the pressure-correction device, means or mechanism is carried by the same pivots which support the remainder of the moving parts of the apparatus, and where their distribution is such that they tend to create an unbalanced arrangement of parts, suitable compensation must be made, as for example, by adding to the mass of the main weight 5 or to that of weight 75, Fig. 10, or by changing the position of the latter so that it will exert a greater or lesser effect.

In Fig. 11 is shown a suitable arrangement of piping and valves for connecting the meter to the agent in the main. 24 indicates the main through which the fluid to be metered flows, and 25 the screw threaded plug or support. The pipe 30 is connected to the low pressure mercury cup at one end and to the agent at the other. The pipe 32 is connected to the high pressure mercury cup at one end and to the agent at the other. In the former pipe is a shut-off valve 85 and in the latter a shut-off valve 86. Connecting pipes 30 and 32 is a cross-pipe 87 containing a shut-off valve 88. Assuming that all these valves are closed and it is desired to start the meter, the valve 88 is opened and then valve 85 or 86. This means that pressure is simultaneously admitted to both mercury cups. Subsequently either valve 85 or 86 is opened, depending upon which one was opened first, and the valve 88 is closed and the meter is ready for operation. This arrangement also has the advantage of permitting the operator to check the " zero " reading of the instrument by comparing the position of the weight and indicator with the zero line on the chart first by opening one pipe to its mercury cup and noting the position of the parts, then closing the pipe and opening the other and noting the position of the parts. The arrangement is such that there is no danger of the mercury being driven out of the cups during this test or in starting the meter. It also enables me to do away with the valve 13 in the connection between cups, thereby simplifying the apparatus to this extent.

The meter described can be used for measuring a fluid wherein the flow is continuous as is the case where steam is supplied to a turbine, or it may be used for metering the steam supplied to a reciprocating engine or a turbine where the flow is more or less pulsatory in character. Where the meter is used for the latter purpose it is preferable to locate the reservoirs 22 and 23, Fig. 12, as close to the agent in the main as possible to avoid the introduction into the system beyond the agent of any substantial amount of elastic fluid which would introduce an error in the reading of the meter. This error is caused by the fact that said elastic fluid is compressed to a greater or less extent each time the velocity of the column of fluid in the main changes due to pulsations. It will be noted that the pipes 30—32 are very short and that the level of the water in the reservoirs is above the lower end of the said agent. Each reservoir is provided with a gage glass 37 so that the amount of water therein can be seen at a glance. The thermostatic valve in this case may be located within the reservoir, the adjusting screw 41 being outside as before.

In a meter of this character it is important that the parts shall be so arranged that all air traps or pockets are avoided since they will introduce a considerable error into the readings. To avoid such air traps or pockets I arrange the parts receiving fluid in a vertical position so that any air which may enter is free to rise and escape. As the steam condenses beyond the agent the water runs downward into the reservoirs, pipes, flexible connectors, mercury cups, etc., and expels the air.

By using an agent of the character described to produce a pressure difference, I obtain a material saving in installing over those meters which require the use of a device inserted in the main steam pipe and containing a Venturi throat. Where such a device is provided, for example in a twelve inch steam main, the cost of making the device, cutting the main, flanging, installing it, etc., would roughly amount to about two hundred dollars. Further it requires shutting down some portion of the plant for a considerable length of time, a thing which station managers are exceedingly loath to do. Again the permanent introduction of such a device into a main results in a loss of power that is objectionable. With my improved meter the main is not disturbed in its position. It is only necessary to drill and tap a one inch hole. I have installed one of my improved agents in such a main and connected it to a meter in less than two hours' time, and this without shutting down the installation beyond cutting off the steam supply to the particular main being worked on. Further I can drill and tap each of the mains leading to the turbines or other engines at a small expense and fit them with agents, and one meter can be employed and moved from place to place as desired. Instead of having the agents in the mains they can be removed and threaded plugs substituted. The saving in such an arrangement over the Venturi construction is obvious.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a fluid meter, the combination of an agent which causes a pressure difference whose value is determined by the rate of flow of the fluid being metered, a movable member, a means responsive to changes in the value of said pressure difference for moving said member, a means for balancing the member, a device for moving the balancing means with respect to the member, means by which the device is controlled by the member, and an indicator whose position is determined by the balancing means.

2. In a fluid meter, the combination of an agent acted upon by the fluid passing through a main to cause a pressure difference, a pivotally supported member, a means for moving the member which is responsive to the pressure difference due to said agent, a weight opposing movements of the member, and a device for changing the effective action of the weight on said member.

3. In a fluid meter, the combination of an agent acted upon by the fluid passing through a main to cause a pressure difference, a pivotally supported member, a means for moving the member which is responsive to the pressure difference due to the agent, a weight opposing movements of the member, a means for varying the effective action of the weight on said member in opposition to the effect of said means, and a movable indicating device whose position is determined by the joint action of the pressure responsive means and the weight.

4. In a fluid meter, the combination of an agent acted upon by the fluid passing through a main to cause a pressure difference, a pivotally supported member, a means for moving the member which is responsive to the pressure difference due to the agent, a weight which opposes movements of said member, a means for moving the weight into different positions to change its effective action, and an indicating device whose position is determined by the joint action of the pressure responsive means and the moving weight.

5. In a fluid meter, the combination of an agent responsive to changes in the rate of flow of a fluid to cause a pressure difference, a movable member, a means causing the member to change its position responsive to the pressure differences due to the agent, a means acting on the member, an electric motor for actuating the last named means, a controller for the motor, and an indicator whose position is determined by that of the last named means.

6. In a fluid meter, the combination of an agent that is acted upon by the fluid to be metered to cause a pressure difference, a pivoted member, a fluid container solely supported by said member for actuating it, the fluid in the container being free to be displaced subject to the action of the agent, conduit means conveying fluid pressure from the agent to the container, an adjustable means for weighing the displaced fluid, and an indicating device moved by said weighing means.

7. In a fluid meter, the combination of an agent that is acted upon by the fluid to be metered, a pivoted member, a fluid container mounted for movement about the pivot of the member and moving with the member for actuating it, the fluid in which is free to be displaced subject to the action of the agent, conduit means conveying fluid pressure from the agent to the container, a means movable on the member for weighing the displaced fluid, a motor for moving the means, and an indicating device movable with said weighing means.

8. In a fluid meter, the combination of an agent responsive to changes in the rate of flow of a fluid to cause a pressure difference, a movable member, a means connected with the agent and responsive to pressure changes for moving the member, means including yielding conduits for conveying fluid under pressure from the agent to the means, a device acting on the member to oppose movements thereof, a means for shifting the position of said device, and an indicator whose position is determined by the joint action of the pressure responsive means and the device.

9. In a fluid meter, the combination of an agent responsive to changes in the rate of flow of a fluid for creating a pressure difference, a pivotally supported member, a pressure-responsive means carried by the member for moving it, means including flexible conduits for conveying fluid under pressure from the agent to the means, a traveling weight mounted on the member to balance the effect of the means thereon, a motor for shifting the position of the weight, a controller for the motor, and an indicating device movable with the weight.

10. In a fluid meter, the combination of an agent responsive to changes in the rate of flow of a fluid for causing a pressure difference, a pivotally supported beam, a means responsive to pressure changes and mounted on the beam for tilting it in one direction or the other, means including elastic conduits for conveying fluid under pressure from the agent to the means, a weight mounted to move along the beam to restore its balance, a motor carried by the beam, for moving the weight, a controller for the motor one part of which moves with the beam, and an indicator moved by the weight.

11. In a fluid meter, the combination of an agent that is acted upon by the fluid to be metered to cause a pressure difference, a pivotally supported beam, means responsive to a change in the conditions of the fluid being metered and which is movable with the beam, means including helically wound conduits for conveying fluid from the agent to the means, a motor moving with the beam, a weight mounted on the beam for balancing the action of the means, a means actuated by the motor for moving the weight, a controller for the motor whose action is controlled by the movement of the beam, and an indicating device moving with the weight.

12. In a fluid meter, the combination of an agent that is acted upon by the fluid to be metered to cause a pressure difference, a beam, knife-edge pivots for the beam, a frame attached to and moving with the beam, means responsive to pressure changes carried by the frame, means including yielding connections carrying fluid under pressure from the agent to the means, an electric motor moving with the beam, a lead screw driven by the motor, a weight threaded on the screw and movable on the beam, a contact device moving with the beam for controlling the motor, stationary contacts co-operating with the movable contact, a source of current supply for the motor communicating with certain of the contacts, and an indicating device moving with the weight.

13. In a fluid meter, the combination of an agent that is acted upon by the fluid to be metered for causing a pressure difference, a pivoted member, an element subjected to the fluid pressure difference due to the agent for moving the member about its axis, means including helically wound flattened tubes for conveying fluid from the agent to the element, the axes of the helices being in line with the plane of the pivot of the member, and an adjustable means coöperating with the member to balance the effect of the agent thereon.

14. In a fluid meter, the combination of an agent that is acted upon by the fluid to be metered to cause a pressure difference, a pivoted member, a fluid container which by displacement of the fluid therein tilts the member in one direction or the other, a weight movable on the member to restore the balanced condition thereof after a displacement of the fluid takes place in the container, means for moving the weight, means connecting the agent with the container, and an indicator whose position changes with that of the weight.

15. In a fluid meter, the combination of an agent that is acted upon by the fluid to be metered to cause a pressure difference, a pivoted member, connected fluid containers which by a change in level of the fluid therein tilt the member in one direction or the other, a weight movable on the member to restore the balanced condition thereof after a change in fluid level takes place in the containers, a motor for moving the weight, a reservoir connected to each of the containers for supplying fluid thereto, a means connecting the agent with each of the reservoirs, and an indicator whose position changes with that of the weight.

16. In a fluid meter, the combination of an agent that is acted upon by the fluid to be metered to cause a pressure difference, a pivoted member, connected fluid containers which by a change in level of the fluid therein tilt the member in one direction or the other, a weight to restore the balanced condition of the member after a change in fluid level takes place in the containers, means for moving the weight on the member, a reservoir connected to each of the containers for supplying fluid thereto, a means connecting the agent with each of the reservoirs, an automatically acting device to maintain a constant level in one of the reservoirs, and an indicator whose position changes with that of the weight.

17. In a fluid meter, the combination of an agent that is responsive to changes in the rate of flow of the fluid being metered, a pivotally supported member, connected mercury-containing cups mounted thereon, a means including a flexible connection between each cup and the agent, a reservoir in each connection containing liquid to supply liquid under pressure to the cups to compensate for a change in level, a means for restoring the equilibrium of the member after a portion of the mercury has been transferred from one cup to another, and an indicator whose position is determined by the joint action of the mercury-containing cups and the equilibrium restoring means.

18. In a fluid meter, the combination of an agent responsive to changes in the rate of flow of the fluid being metered, a tilting member, means for actuating the member comprising connected mercury containers which are carried thereby, independent connections extending from the agent to the containers, reservoirs in the connections whose cubical contents exceed those of the containers, a movable weight for balancing the effect of the means on the member, and an indicator whose position is determined by the joint action of the means and the weight.

19. In a fluid meter, the combination of an agent acted upon by the fluid to be metered to cause a pressure difference, a movable member, a means causing the member to change its position responsive to the pressure difference due to the agent, an adjustable means movable on the member for balancing the effect of the agent thereon, an indicating device comprising a marker which changes its position with that of the adjustable means, and a moving chart with which the marker engages.

20. In a fluid meter, the combination of an agent acted upon by the fluid to be metered having a plurality of oppositely disposed funnels arranged in sets, whose action depends upon the mean velocity of the fluid being metered, a movable member, and a means for moving the member that is acted upon by fluid pressure from the sets of funnels.

21. In a fluid meter, the combination of an agent located in the conduit carrying the fluid to be metered and which causes a pressure difference, a pivoted member, a means for tilting the member whose action is determined by that of the agent, a means for balancing the effect of the agent on the member, a device sensitive to changes in a condition of the fluid being metered for modifying the action of the means on said member attached to and moving with the balancing means.

22. In a fluid meter, the combination of an agent that is acted upon by the fluid being metered to cause a pressure difference, a movable member, a means for moving the member that is actuated by fluid pressure transmitted to it from the agent, a weight that is adjustably mounted on the member to balance the effects of fluid from the agent thereon, and a device responsive to pressure changes of the fluid being metered for modifying the action of the weight on the member.

23. In a fluid meter, the combination of an agent that is acted upon by the fluid being metered to cause a pressure difference, a pivoted member, means for tilting the member whose action is determined by that of the agent, a divided weight movable on the member to balance the effect of the agent thereon, and a pressure-correction device acting on one part of the weight.

24. In a fluid meter, the combination of an agent that is acted upon by the fluid being metered to cause a pressure difference, a pivoted member, means for moving the member whose action is determined by a pressure difference due to the agent, a weight which is adjustable on the member to balance the effect of the agent thereon, and a pressure-correction device which progressively increases its effect as the pressure of the fluid being metered increases.

25. In a fluid meter, the combination of an agent that is acted upon by the fluid being metered to cause a pressure difference, a pivoted member, a means for moving the member on its pivot whose action is determined by the pressure difference due to the agent, a divided weight which moves on the member to balance the effect of the agent thereon, a pressure-correction device, a connection between the correction device and one part of the weight for moving it, the movement of the connection progressively increasing in amplitude for each unit increase of pressure as the rate of flow of the fluid being metered increases, and an indicator which is movable with one portion of the weight.

26. In a fluid meter, the combination of an agent whose action is responsive to changes in the rate of flow of the fluid being metered, a pivoted member, a motor receiving fluid from the agent for moving the member on its pivot, a divided and adjustable weight carried by the member, an indicator movable with one portion of the weight only, a connection between the parts of the weight, a pressure device which automatically moves the parts of the weight with respect to each other as the pressure of the fluid being metered changes, a motor and a means actuated by the motor for moving the divided weight as a unit on the member to balance the effects of the agent thereon.

27. In a fluid meter, the combination of an agent whose action is responsive to changes in the rate of flow of the fluid being metered, a pivoted member, a means for moving the member in response to the action of the agent, a divided and adjustable weight carried by the member, an indicator movable with one portion of the weight only, a connection between the parts of the weight, a pressure device, a conical means moved by the pressure device, a device moved by the conical means to adjust one portion of the weight with respect to the other, a motor for moving the parts of the weight as a unit, and a controller for the motor.

28. In a fluid meter, the combination of an agent whose action is responsive to changes in the rate of flow of the fluid being metered, a pivoted member, means for moving the member in response to the action of the agent, a divided and adjustable weight carried by the member, an indicator movable with one portion of the weight only, a connection between the parts of the weight, a means responsive to changes in pressure of the fluid being metered, a conical device, gearing between the means and the device, means for transmitting motion from the conical device to one portion only of the weight, a motor, a connection between the motor and the weight for moving the latter as a unit to balance the effects of the agent on the meter, and a controller for the motor.

29. A means for creating a pressure difference which varies with changes in the rate of flow of a fluid in a conduit, comprising a member having orifices opening in one direction and responsive to the mean velocity of the fluid flowing in the conduit, and other orifices also responsive to the mean velocity of a fluid flowing in the main, the said orifices causing a pressure difference, and means for conveying fluid pressure from the orifices.

30. In a fluid meter, an agent that is responsive to changes in the rate of flow of the fluid being metered and is adapted to be located in the fluid-carrying conduit, which comprises an element containing a set of orifices opening in the direction of flow of the fluid, a passage connecting them, a second set of orifices opening in a different direction, and a passage connecting the orifices of the second set, the said sets of orifices causing a pressure difference.

31. In a fluid meter, an agent that is responsive to changes in the rate of flow of the fluid being metered, which comprises a support, an element carried thereby having sets of oppositely opening funnels, independent passages connecting the funnels of the different sets, the said sets of funnels causing a pressure difference, and conduits connected with the passages.

32. In a fluid meter, the combination of an agent acted upon by the fluid to be metered to cause a pressure difference, a pivotally supported container containing a body of heavy liquid which is displaced in the container by said pressure difference, means connecting the agent and container, a means moved by the container, and means for equalizing the pressures on opposite sides of the container to prevent the difference in pressure created by the agent from forcing said body of liquid out of the container.

33. In a fluid meter, the combination of an agent responsive to variations in the rate of flow of the fluid being metered which causes a pressure difference, a means actuated by said pressure difference, a means for weighing the effect of said pressure difference on the means, a motor for adjusting the weighing means, a source of supply for actuating the motor, and a relay device regulating the supply of energy from the source to the motor, the said relay device being controlled by the first mentioned means.

34. In a fluid meter, the combination of an agent sensitive to variations in the rate of flow of the fluid being metered for creating a pressure difference, a means acted upon by said pressure difference, means including reservoirs through which fluid pressure is transmitted from the agent to the means, the reservoirs being so disposed that the level of the liquid therein approximates that of the liquid in the agent to prevent any considerable body of elastic fluid being trapped beyond the agent, and an indicating device moved by the means that is acted upon by the pressure difference.

35. In a fluid meter, the combination of an agent acted upon by the fluid being metered to cause a pressure difference, a means for balancing the said pressure difference which includes a motor and a device, means for communicating motion from the motor to the device, a brake for preventing overtravel of the motor, and an indicating device actuated by the device.

36. In a fluid meter, the combination of an agent which causes a pressure difference whose value is determined by the rate of flow of the fluid being metered, a movable member, means receiving fluid pressure from the agent for moving the member to different positions determined by a change in the pressure difference caused by said agent, a movable weight which balances the force exerted by said means on the member, means for moving the weight a greater or less distance determined by the value of said pressure difference to cause it to vary its effective weighing action on the member, and an indicating device whose position is determined by the joint action of the means and the weight.

37. In a fluid meter, the combination of an agent which causes a pressure difference whose value is determined by the rate of flow of the fluid being metered, a movable member, means receiving fluid pressure from the agent for moving the member to different positions determined by a change in the pressure difference caused by said agent, a movable weight which balances the force exerted by said means on the member, means for moving the weight a greater or less distance determined by the value of said pressure difference to cause it to vary its effective weighing action on the member, a device responsive to a change in pressure of the fluid meter which modifies the action of the weight, and an indicating device whose position is determined by the joint action of the means and weight.

38. A means for creating a pressure difference comprising a base carried by the main through which the fluid to be metered flows with a means supported by the base which is provided with forwardly and rearwardly opening orifices that are exposed to the average velocity of the fluid flowing in the main, the said orifices occupying the same plane.

39. In an apparatus of the character described, the combination of a conductor pipe, a scale beam, a hollow member supported by said beam and comprising connected parts, means whereby the weight of the contents of one of said parts may be automatically forced into another part by a change of the flow through said conductor, a counterbalance weight on said beam, and means whereby said weight is automatically moved along said beam to accurately counterbalance any change in weight of the contents of said member.

40. In an apparatus of the character described, the combination of a conductor pipe, a scale beam, a hollow member supported by said beam and comprising connected parts, means for automatically discharging a portion of the contents of one of the parts into the other due to a change of the flow through said conductor, a counterbalance weight on said beam, a motor, means whereby the position of said beam controls the action of said motor, and means whereby the action of said motor controls the movement of said weight along said beam to accurately counterbalance any change in weight of the contents of the supported member.

41. In an apparatus of the character described, the combination of a conductor pipe, a scale beam, a hollow member supported by said beam, means for automatically varying the weight of the contents of said member by a change of the flow through said conductor, a counterbalance weight on said beam, a motor, means whereby the position of said beam controls the motor, and means whereby the motor controls the movement of the weight along the beam to accurately counterbalance any change in weight of the contents of the supported member, and means coöperating with said weight for showing the amount of fluid which passes through said pipe.

42. In an apparatus of the character described, the combination of a main supply pipe, a scale beam, a receptacle supported by said beam, means for automatically varying the weight of the contents of said receptacle by a difference between the pressure at two points in said pipe, a counterbalance weight on said beam, means whereby said counterbalance is automatically moved along said beam a distance sufficient to counterbalance each change in weight of the contents of said receptacle, and means coöperating with said counterbalance for showing the amount of fluid passing through said pipe.

43. In an apparatus of the character described, the combination of a conductor pipe, a scale beam, two vessels containing liquid of greater specific gravity than the fluid to be measured, the same being supported by said beam, one on either side of its balancing point, means of communication between said vessels, means whereby a change in the flow through said conductor will automatically change the relative weights of the contents of said vessels, a counterbalance, and means for automatically adjusting the same to balance any such change in the relative weights of the contents of said vessels.

44. In an apparatus of the character described, the combination of a conductor pipe, a scale beam, two vessels containing liquid of greater specific gravity than the fluid to be measured, the same being supported by said beam, a connection between said vessels, means whereby a change in the flow through said conductor will automatically change the relative weights of the contents of said vessels, a counterbalance weight, and a motor controlled by the position of said beam whereby said weight is caused to automatically compensate for any such change in the relative weights of the contents of said vessels.

45. In an apparatus of the character described, the combination of a conductor pipe, a scale beam, two vessels containing liquid of greater specific gravity than the fluid to be measured, the same being supported by said beam one on each side of its balancing point, a connection between said vessels, means whereby a change in the flow through said conductor will automatically change the relative weights of the contents of said vessels, a counterbalance weight on said beam, a motor controlled by the position of said beam whereby said weight is caused to be moved along said beam to accurately compensate for any such change in the relative weights of the contents of said vessels, and means operated by said counterbalancing means for showing the amount of fluid which passes through said pipe.

46. In an apparatus of the character described, the combination of a conductor pipe, a scale beam, two vessels containing liquid of greater specific gravity than that to be measured supported by said beam one on either side of its pivoting point, a connection between said vessels, means whereby a change in the flow through said pipe will automatically change the relative weights of the contents of said vessels, a counterweight, a motor controlled in its action by the position of said beam whereby said counterweight is caused to automatically compensate for any such change in the relative weights of the contents of said vessels.

47. In an apparatus of the character described, the combination of a conductor pipe, a scale beam, two vessels supported on said beam, one on each side of its balancing point, a connection between said vessels, said vessels jointly containing a body of liquid of greater specific gravity than that of the fluid to be measured, means whereby the differential pressure in said pipe of the fluid to be measured causes a proportional flow of said heavy liquid from one vessel to the other, and means for automatically compensating for any change in the relative weights of the contents of said vessels.

48. In an apparatus of the character described, the combination of a conductor pipe, a scale beam, two vessels supported on said beam, one on each side of its balancing point, a connection between said vessels, said vessels jointly containing a body of liquid of greater specific gravity than that of the fluid to be measured, means whereby the differential pressure in said pipe of the fluid to be measured causes a proportional flow of said heavy liquid from one vessel to the other, means for automatically compensating for any change in the relative weights of the contents of the vessels whereby the beam may be brought to a level position, and means operated by the counterbalancing means for showing the amount of fluid which passes through the pipe.

49. In an apparatus of the character described, the combination of a conductor pipe, a scale beam, two vessels containing liquid of greater specific gravity than the fluid to be measured, the same being supported by said beam, one on either side of its pivoting point, a connection between said vessels, means whereby a change in the flow through said conductors will automatically change the relative weights of the contents of said vessels, a counterweight on said beam, means whereby said counterweight is automatically moved along said beam to accurately compensate for any such change in the relative weights of the contents of said vessels, and means whereby the rate of flow as indicated by the position of said counterbalance on the scale beam is recorded.

50. In an apparatus of the character described, the combination of a conductor pipe, a scale beam, two vessels supported on said beam, one on each side of its balancing point, a connection between said vessels, said vessels jointly containing a body of liquid of greater specific gravity than that of the fluid to be measured, means whereby the differential pressure in said pipe of the fluid to be measured causes a proportional flow of said heavy liquid from one vessel to the other, a flexible tube and means whereby the same is connected to the upper portion of said vessel for conducting only the fluid to be measured, and means including an adjustable counterweight for automatically compensating for any change in the relative weights of the contents of the vessels.

51. In a fluid meter, the combination of an agent responsive to changes in the rate of flow of a fluid for causing a pressure difference, a pivotally supported beam, a hollow member supported by the beam and containing a fluid heavier than that being metered, conduit means connecting the agent and the hollow member to cause displacement of the fluid in the member, a counterbalancing weight mounted on the beam, a motor also mounted on the beam and connected to the weight for moving it with respect to the fulcrum of the beam, and a controller for the motor, one part of which is stationary and the other responsive to movements of the beam.

52. A device for creating differential pressure which varies with changes in the rate of flow of a fluid in a supply main comprising means extending through a wall of the main and provided with suitably spaced orifices that are subjected to the mean velocity of the fluid flowing in said main and also with another orifice facing in a different direction than the first named orifices and subjected to the action of said fluid, a conduit communicating with the first named orifices, and a second conduit communicating with the second orifice, both of said conduits terminating at points outside of the main.

In witness whereof I have hereunto set my hand this 16th day of March, 1908.

AUSTIN R. DODGE.

Witnesses:
   BENJAMIN B. HULL,
   HELEN ORFORD.

the other responsive to movements of the beam.

52. A device for creating differential pressure which varies with changes in the rate of flow of a fluid in a supply main comprising means extending through a wall of the main and provided with suitably spaced orifices that are subjected to the mean velocity of the fluid flowing in said main and also with another orifice facing in a different direction than the first named orifices and subjected to the action of said fluid, a conduit communicating with the first named orifices, and a second conduit communicating with the second orifice, both of said conduits terminating at points outside of the main.

In witness whereof I have hereunto set my hand this 16th day of March, 1908.

AUSTIN R. DODGE.

Witnesses:
BENJAMIN B. HULL,
HELEN ORFORD.

---

It is hereby certified that in Letters Patent No. 1,087,930, granted February 24, 1914, upon the application of Austin R. Dodge, of Schenectady, New York, for an improvement in "Meters for Elastic Fluids," an error appears in the printed specification requiring correction as follows: Page 2, line 71, strike out the word "and"; and that the said Letters Patent should be read with this correction therein that the same may conform to the record of the case in the Patent Office.

Signed and sealed this 24th day of March, A. D., 1914.

[SEAL.]

J. T. NEWTON,
Acting Commissioner of Patents.

Correction in Letters Patent No. 1,087,930.

It is hereby certified that in Letters Patent No. 1,087,930, granted February 24, 1914, upon the application of Austin R. Dodge, of Schenectady, New York, for an improvement in "Meters for Elastic Fluids," an error appears in the printed specification requiring correction as follows: Page 2, line 71, strike out the word "and"; and that the said Letters Patent should be read with this correction therein that the same may conform to the record of the case in the Patent Office.

Signed and sealed this 24th day of March, A. D., 1914.

[SEAL.]

J. T. NEWTON,
*Acting Commissioner of Patents.*